(12) United States Patent
Herrmann et al.

(10) Patent No.: US 8,464,755 B2
(45) Date of Patent: Jun. 18, 2013

(54) HYDRAULIC CONTROL ARRANGEMENT FOR CONTROLLING A VARIABLE FLUID VOLUME FLOW (75) Inventors: Markus Herrmann, Scheidegg (DE); Anton Fritzer, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 387 days.

(21) Appl. No.: 12/921,917

(22) PCT Filed: Feb. 6, 2009

(86) PCT No.: PCT/EP2009/051397
§ 371 (c)(1),
(2), (4) Date: Sep. 10, 2010

(87) PCT Pub. No.: WO2009/112316
PCT Pub. Date: Sep. 17, 2009

(65) Prior Publication Data
US 2011/0031423 A1 Feb. 10, 2011

(30) Foreign Application Priority Data
Mar. 14, 2008 (DE) .......................... 10 2008 000 679

(51) Int. Cl.
*F15B 13/04* (2006.01)
(52) U.S. Cl.
USPC .................... 137/625.63; 192/3.29; 192/85 R
(58) Field of Classification Search
USPC . 137/625.63, 625.66; 192/3.29, 85 R; 251/29
See application file for complete search history.

(56) References Cited

U.S. PATENT DOCUMENTS

| | | | |
|---|---|---|---|
| 4,989,702 A * | 2/1991 | Yoshimura et al. | 192/3.29 |
| 6,591,958 B1 | 7/2003 | Moorman | |
| 6,615,966 B2 | 9/2003 | Kato | |
| 6,666,225 B2 | 12/2003 | Kemmner et al. | |
| 7,243,767 B2 | 7/2007 | Gierer et al. | |
| 7,338,402 B2 | 3/2008 | Bucher et al. | |
| 2006/0169563 A1 | 8/2006 | Schaufler | |
| 2007/0187204 A1 | 8/2007 | Gierer et al. | |
| 2008/0179158 A1 | 7/2008 | DeMaziere | |

FOREIGN PATENT DOCUMENTS

| | | |
|---|---|---|
| DE | 100 41 386 A1 | 3/2002 |
| DE | 103 33 236 A1 | 2/2005 |
| DE | 10 2004 027 115 A1 | 12/2005 |
| EP | 1 191 258 A2 | 3/2002 |
| EP | 1 469 235 A1 | 10/2004 |
| WO | 2004/102042 A1 | 11/2004 |
| WO | 2006/119973 A1 | 11/2006 |

* cited by examiner

*Primary Examiner* — Eric Keasel
*Assistant Examiner* — R. K. Arundale
(74) *Attorney, Agent, or Firm* — Davis & Bujold, PLLC

(57) ABSTRACT

A hydraulic control system for controlling a variable fluid volume flow to a consumer (6, 60, 94, 126, 146, 162), for example a flow of cooling oil to a wet-operating clutch, with a hydraulically pilot-controlled control valve connected to a fluid supply. The first control valve (2, 56, 90, 122, 142) is designed such that, in the absence of any pilot control pressure (pVST), the valve delivers a specified initial volume flow ($Q_1$) and, as the variable pilot control pressure (pVST) increases, the valve delivers a continuously increasing volume flow ($Q_K$). At least one second, independent, also hydraulically pilot-controlled valve (170) is designed such that this valve is activated in a specified range (55, 88, 120, 132, 140, 152) of the variable pilot control pressure (pVST).

12 Claims, 4 Drawing Sheets

HYDRAULIC CONTROL ARRANGEMENT FOR CONTROLLING A VARIABLE FLUID VOLUME FLOW

This application is a National Stage completion of PCT/EP2009/051397 filed Feb. 6, 2009, which claims priority from German patent application serial no. 10 2008 000 679.3 filed Mar. 14, 2008.

FIELD OF THE INVENTION

The present invention concerns a hydraulic control system. The system according to the invention is intended, in particular even if not exclusively, for supplying cooling and lubricating oil to wet-operating clutches, and must therefore have corresponding specific properties.

BACKGROUND OF INVENTION

Fluid volume flows can be regulated, for example by means of fluid pumps with a variable delivery volume or by fluid pumps with a constant delivery volume and downstream control valves. As volume flow regulating valves, in general throttle-type distribution valves connected to a substantially constant fluid supply and referred to below as control valves are used, whose functional principle is that a volume flow admitted is throttled to a greater or lesser extent by a sharp-edged diaphragm of variable cross-section so that the volume flow emerging from the control varies. The pressure drop produced at the sharp-edged diaphragm increases quadratically with increasing volume flow and accordingly the pressure drop is small with a small volume flow but becomes rapidly larger as the volume flow increases. As a result, when the volume flow is small the regulation thereof reacts very sensitively to interfering factors (such as component tolerances, friction forces, control pressure tolerances etc). This problem increases with the size of the maximum volume flow for which a control valve is designed. When supplying cooling oil to clutches the additional problem arises that, particularly in cold weather, residual volume flow produces a damaging drag torque which can make synchronization in a downstream transmission more difficult, so that in such cases too the cooling oil supply to the clutch has to be adapted as necessary.

To enable a specified larger volume flow but at the same time to be able to control small volume flows as exactly as possible, one possibility is to produce or shift a control valve which has more than one, for example two working ranges, such as a lower volume flow range and one or more higher volume flow ranges.

From DE 103 33 236 A1 a hydraulic control system of the type mentioned is already known, which serves to control a cooling medium flow for cooling the clutch of a dual-clutch transmission in a motor vehicle. It comprises two control valves or two control pistons arranged in a housing, such that a radially outer control piston is guided to move axially in the housing and a second control piston moves in the first control piston. The two control pistons are each acted upon by the same pilot control pressure in opposition to the force of respectively associated restoring springs, the restoring springs having different spring constants so that the two control pistons are activated at different pilot control pressures. Since oil is supplied to and drained away from the inner control piston via ducts formed in the outer control piston, the two control valves are not independent, i.e. the emerging volume flow depends in each case on the respective relative and absolute position of the two control pistons. As a whole, the component concerned is of extremely complex design, difficult to produce, and therefore expensive. Furthermore, if one of the two control pistons fails, the entire control system breaks down and has to be replaced.

SUMMARY OF THE INVENTION

Against this background the purpose of the present invention is to provide a hydraulic control system, by means of which both small and large volume flows can be regulated optimally and in particular the volume flow can be reduced to a minimal residual amount, and which can be produced using simple control valves commonly available on the market. Furthermore, it should also be possible to activate or deactivate other devices as well by means of the same control system.

These objectives are achieved by the characteristics specified in the principal claim, while advantageous design features and further developments of the invention emerge from the subordinate claims.

The invention is based on the recognition that a control function similar to that performed by the known control valve described above can be achieved more simply and inexpensively with independent control valves which are appropriately pilot-controlled or switched together with additional valves, such that further, additional control functions, for example reduction of a volume flow to a minimal residual amount, can be integrated, and such that if one control valve fails, only it has to be replaced or repaired, whereas the other components of the control system can continue being used.

Thus, according to the characteristics of the principal claim the invention starts from a hydraulic control system for controlling a variable fluid volume flow to a consuming load, with a hydraulically pilot-controlled control valve connected to a fluid supply.

To achieve the set objective, in this case it is provided that a first, independent control valve is designed such that in the absence of a pilot control pressure pVST it delivers a specified initial volume flow $Q_1$, then as the variable pilot control pressure pVST is increased continuously it delivers a continuously increasing volume flow $Q_K$, and at least one second, independent, also hydraulically pilot-controlled control valve is designed such that it is activated in a specified range of the variable pilot control pressure pVST. The at least one second control valve can be a third control valve.

As already implied earlier, for many applications it is necessary to entirely stop the volume flow to a consumer or reduce it to a minimal residual amount. For example, this is so for a cooling medium for wet-operating clutches. Consequently provision is made by the present invention for the volume flow of the cooling medium to be stopped entirely or reduced to a minimal residual amount. The residual amount is either the quantity of fluid that can flow to the consumer through gap leaks, or a defined minimum quantity intended, for example in the case of a clutch, to ensure a minimum level of cooling or lubrication. In any case the residual amount should be small enough at least largely to avoid harmful drag torques in clutches.

In addition, with the control system according to the invention, if there is no pilot control pressure or one which is not yet sufficiently high, an initial volume flow $Q_1$ of cooling fluid, albeit one which is comparatively small, is delivered to the consumer, and this can be advantageous for example just after a vehicle has been started.

Furthermore, the first control valve is designed such that as the variable pilot control pressure increases continuously, it delivers a continuously increasing volume flow in the lower volume flow range. As has been indicated earlier, by virtue of a division into a lower volume flow range and one or if necessary more than one upper volume flow range(s), it is made possible to control even small volume flows exactly despite the large volume flows provided for in the upper volume flow range(s).

Moreover, the control system according to the invention enables at least one further independent control valve to be activated, which can for example initiate emergency operation of some other device or consumer or of the same consumer (clutch), as will be explained in greater detail with reference to a number of example embodiments.

In a preferred embodiment of the invention, the first control valve is designed such that in the absence of any pilot control pressure it is set by the fluid supply pressure itself to a control position in which it delivers a specified initial volume flow to the consumer. For this purpose the fluid supply pressure is applied on a control area of the valve slide so that the latter is moved, against the force of a restoring spring, to a position that depends on the spring force, such that a specified volume flow flows to the consumer.

A further feature of the invention provides that the first control valve is designed such that when a pilot control pressure reaches a specific value which corresponds to the upper limit of the lower volume flow range (the shut-off pressure), the valve is moved to a position where it still delivers or lets through only a minimum volume flow to the consumer. In this way, even when the control valve is switched off a minimum quantity of fluid can pass through to the consumer, for example to a clutch, for the purpose of cooling or lubrication.

The pilot control pressure corresponding to the shut-off pressure can act directly on a control surface of a valve slide. According to another design of the invention, a shut-off valve actuated by the pilot control pressure is associated with the first control valve, which shuts off the control valve when the shut-off pressure is reached, as will also be described with reference to example embodiments. The minimum volume flow allowed through once the first control valve has been shut off can be a leakage volume flow, or it can correspond to a defined supply volume flow.

If a fluid cooler is provided in the fluid supply line of the first control valve, then according to another design feature of the invention the first control valve is designed such that in the absence of a pilot control pressure, in any case it maintains a specified bypass volume flow to a fluid reservoir tank so that the throughput through the fluid cooler will be sufficient in any working range. This volume flow passing into the fluid reservoir tank can decrease continuously as the quantity of fluid passing to the consumer increases, since the latter ensures a sufficient throughput through the fluid cooler.

A further design feature of the control system according to the invention provides that a booster valve actuated by a pilot control pressure is associated with the first control valve, by means of which the first control valve can be switched to a position in which the regulating function of the first control valve is switched off and, within the upper volume flow range, a specified maximum volume flow is let through. In turn, when a specified pilot control pressure level is reached, this can be shut off for example by a shut-off valve.

In addition at least one further control valve is provided, which is activated for example in an initial pilot control pressure range or in a final range of the pilot control pressure by the respective pilot control pressure associated therewith. By means of this activation of the second control valve, for example in the event of a fault, the emergency operation of some other device can be initiated. In this way the pilot control pressure can be used both for the normal regulation according to need, for example, of the cooling oil supply to a vehicle clutch, and also for the control or emergency activation of some other vehicle device.

BRIEF DESCRIPTION OF THE DRAWINGS

The invention can be explained further with reference to a number of example embodiments. For this purpose the description of a drawing is attached, which shows.

DETAILED DESCRIPTION OF THE PREFERRED EMBODIMENTS

Figure 1A:
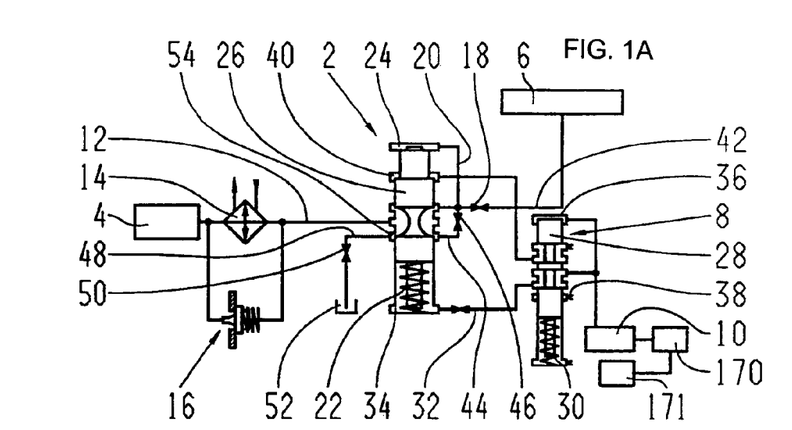
FIGS. 1A and 1B hydraulic control system with a first control valve and a shut-off valve, and a diagram showing the pressure a second control valve can be activated in the upper end range of the pilot control pressure relationship FIGS. 2A and 2B hydraulic control system with a first control valve with a shut-off function, and a diagram showing the pressure a second control valve can be activated in the initial range of the pilot control pressure FIGS. 3A and 3B hydraulic control system with a first control valve and a shut-off valve, and a diagram showing the pressure a second control valve is activated in an initial pilot control pressure range FIGS. 4A and 4B hydraulic control system with a first control valve and a shut-off function that operates directly on it, and a diagram showing the pressure a second control valve is activated in an initial pilot control pressure range FIGS. 5A and 5B hydraulic control system with a first control valve and a shut-off function that operates directly on it, and a diagram showing the pressure a second control value is activated in a final pilot control pressure range FIGS. 6A and 6B hydraulic control system with a first control valve having a shut-off function, and a diagram showing the pressure a second control valve is activated in the initial pilot control pressure range.

Accordingly, FIG. 1A shows a hydraulic control system for controlling a variable fluid volume flow to a consumer, in this case for controlling a flow of cooling oil to a wet-operating clutch. The control system comprises a first control valve 2 which is connected to a fluid supply 4, for example a fluid pump, and by means of which a fluid volume flow to a clutch 6 is controlled. The first control valve 2 is a distributor valve with a control piston which, depending on its position, opens or closes various inlet and outlet cross-sections in a variable manner, as known per se.

Associated with the first control valve 2 is a shut-off valve 8, which is acted upon by a pilot control pressure pVST delivered for example by a pilot control valve 10 and which also passes the pressure on to the first control valve 2 as yet to be described.

In the fluid supply line 12 is provided a fluid cooler 14 in which the fluid heated for example in a transmission associated with the clutch is cooled. The fluid cooler 14 can be bypassed via a bypass valve 16.

The pilot control valve 10 also delivers the pilot control pressure pVST via a pressure line to a second control valve 170, whereby when this second control valve reaches a predetermined upper or lower limit value PX of the pilot control pressure pVST, it switches other consumers 171 or vehicle devices on or off. For example an emergency operation function for a clutch actuator can be switched on, by virtue of which the clutch actuator keeps the vehicle clutch engaged so long as the speed of the drive engine and/or the driving speed do not fall below predetermined limit values.

Figure 1B:
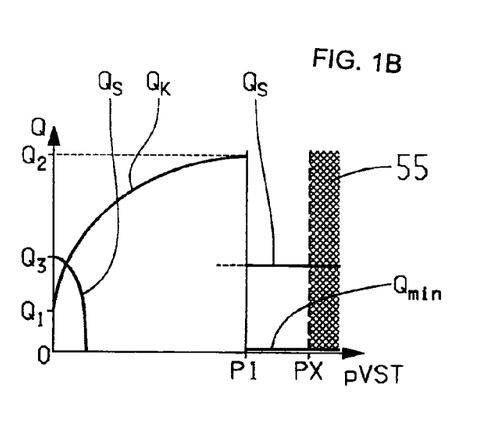

Thus, the mode of operation of the hydraulic control system shown in FIGS. 1A and 1B is as follows:

In the absence of any pilot pressure pVST, the fluid cooled in the fluid cooler 14 flows through the first control valve 2 and past the diaphragm 18 downstream therefrom in the direction toward the clutch 6, producing at the diaphragm 18 a dynamic pressure which passes, via a line 20, to the pressure space 24 of the first control valve 2 facing away from the restoring spring 22. The pressure acting in the pressure space 24 exerts on the valve slide 26 of the first control valve 2 a force opposing the force of the restoring spring 22, so that the valve slide 26 reduces the outlet cross-section and regulates an initial volume flow as a function of the spring force. In diagram 1b shown to the right of the control system this volume flow is denoted as $Q_1$. In this operating condition, the shut-off valve 8 adopts the position shown in FIG. 1A, in which its valve slide 28 is held by the restoring spring 30 in the upper end position. During this, the pilot control valve 10 which delivers the pilot control pressure pVST is also connected via the shut-off valve 8 and the connecting line 32 to the spring space 34 of the control valve 2.

If the pilot control pressure pVST is now increased continuously, in the first control valve 2 this acts in support of the spring force and therefore increases the fluid volume flow to the clutch 6 via the diaphragm 18. At the same time the pilot control pressure pVST also acts in a pressure space 36 of the shut-off valve 8 facing away from the restoring spring 30. If the restoring spring 30 is designed appropriately, then when a specified maximum fluid volume flow to the clutch 6 that corresponds to a shut-off pressure P1 is exceeded, the valve slide 28 of the shut-off valve 8 is pushed downward against the force of the restoring spring 30 in such manner that the connection of the pilot control pressure pVST, via the connecting line 32, to the spring space 34 of the control valve is interrupted, and the latter is vented, via the tank connection 38, to the fluid reservoir tank.

In parallel with the above, the shut-off valve 8 provides a connection of the pilot control pressure pVST to a second pressure space 40 facing away from the restoring spring 22. There, acting on the associated annular surface of the valve slide 26 the pilot control pressure pVST exerts a force on the valve slide 26 which is larger than the force of the restoring spring 22, so that the valve slide 26 is moved to its end position on the spring side, where the fluid volume flow through the line 42 to the clutch 6 is interrupted. However, when the fluid volume flow is thus shut off, a minimum quantity $Q_{min}$ of fluid can pass via a line 44 and past a diaphragm 46 through to the clutch 6 for cooling and lubrication purposes. At this working point additional fluid passes via a line 48 and a bypass diaphragm 50 into a reservoir tank 52 or sump so that the fluid cooler 14 will have a sufficient fluid throughput, as will be explained below.

The diagram of FIG. 1B, presented in relation to the control system of FIG. 1A, shows the fluid volume flow $Q_K$ serving to cool and lubricate the clutch 6, as a function of the pilot control pressure pVST, beginning with the fluid quantity or initial volume flow $Q_1$ when there is no pilot control pressure pVST up to the fluid quantity or final volume flow $Q_2$ at the moment of shut-off at a pilot control pressure pVST=P1. When the shut-off valve 8 has been actuated, the fluid volume flow decreases to a leakage flow or a fluid quantity $Q_{min}$ corresponding to a specified residual quantity.

After the shut-off valve 8 has been actuated, the pilot control pressure pVST delivered by the pilot control valve 10 can be used to actuate the second control valve 170, which in the example shown in FIG. 1B, is activated at a pilot control pressure PX higher than P1 and can switch on or off some other device or other cooling fluid consumer.

As already briefly mentioned earlier, in many applications the fluid delivered to the first control valve 2 passes through an upstream fluid cooler 14, namely for example when the fluid has previously passed through an associated transmission in which it has been heated. Thus, in the general case the fluid quantity passing through the fluid cooler 14 is interconnected with the fluid quantity delivered to the clutch 6. The result of this can be that to lower the transmission temperature, clutch cooling necessarily has to be activated, whereby in certain operating situations the efficiency of the transmission and hence the fuel consumption are unnecessarily made worse (drag losses at the rotating clutch components) and more air is drawn into the fluid, since a large quantity of fluid is passed through the rotating clutch. For example, this can happen when driving in a constant gear on a motorway or country road, when although it is true that no friction heat is generated in the clutch, the heat produced in the transmission causes the fluid temperature to rise.

To reduce the volume flow to the clutch without reducing the volume flow through the fluid cooler, the control system is provided with a bypass function by virtue of which, at any setting of the first control valve 2, i.e. regardless of the fluid quantity delivered to the clutch, a minimum volume flow passes through the fluid cooler. For this purpose an additional volume flow is passed into the reserve tank 52. In the diagrams of FIGS. 1B to 5B and 7B this is indexed $Q_S$. As can be seen for example in FIG. 1B, when there is no pilot control pressure pVST, a fluid quantity $Q_3$ flows, and as the pilot control pressure pVST increases and thus the fluid quantity going to the clutch 6 also increases, this flow $Q_3$ decreases continuously down to zero since the control edge 54 belonging to the line 48 becomes progressively closed. Accordingly, a fluid quantity always flows through the fluid cooler 14, which is the sum of the values $Q_K$ and $Q_S$. When the first control valve 2 is shut off, the control edge 54 is again opened fully, so that the volume flow $Q_S$ again has approximately the valve $Q_3$.

Figure 2A:
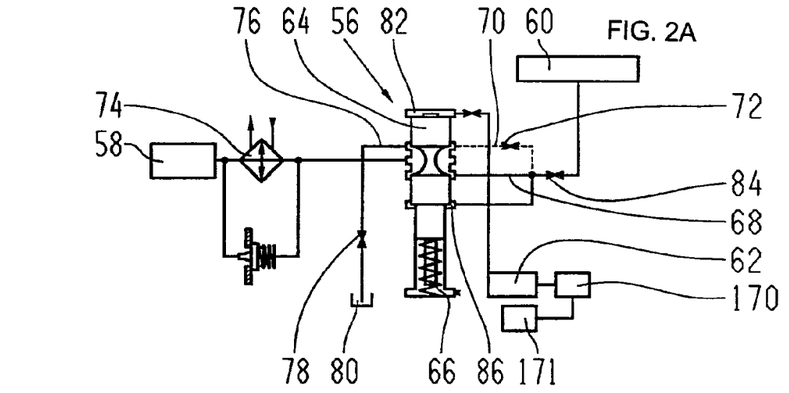
Figure 2B:
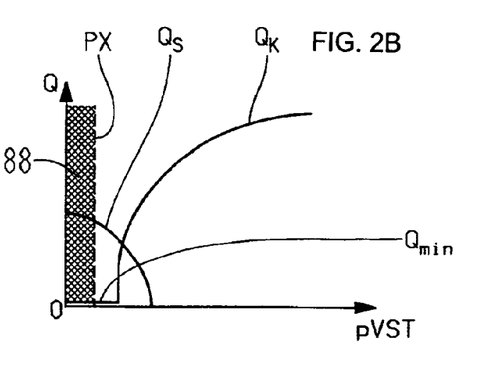

FIG. 2A shows a control system which, compared with the control system shown in FIG. 1A, has a simpler structure comprising fewer components. It comprises a first control valve 56 connected to a fluid supply 58, and as the consumer, for example again a clutch 60. In the absence of a pilot control pressure pVST delivered by a pilot control valve 62, the valve slide 64 of the control valve 56 is pushed by the restoring spring 66 to its upper end position, whereby the connecting line 68 to the clutch 60 is closed. Yet by virtue of gap leaks, a small quantity of fuel $Q_{min}$ still flows to the clutch 60, as can be seen in the diagram of FIG. 2B shown to the right of the control system. As in the variant shown in FIG. 1B, here too a defined minimum fluid quantity $Q_{min}$ can flow to the clutch 60 via a line 70 and a diaphragm 72. To maintain a sufficient fluid throughput through the fluid cooler 74 upstream from the control valve 56, as in FIG. 1A fluid is passed into the reservoir tank 80 via a line 76 and an associated bypass diaphragm 78, as shown by the curve $Q_S$.

By increasing the pilot control pressure pVST, the valve slide 64 is pushed by the action of the pressure space 82 facing away from the restoring spring 66 against the force of the spring 66. This continuously closes the connection in the direction of the reservoir tank 80, i.e. the fluid quantity $Q_S$ is reduced continuously down to zero. At the same time the control valve 56 continuously opens the path to the connecting line 68 so that the fluid flow $Q_K$ to the clutch 60 increases continuously. By appropriate design of the control edge coverage of the line 76 on the one hand and of the connecting line 68 on the other hand, the intersection of the two volume flows $Q_S$ and $Q_K$ can be designed such that over the entire operating range of the control valve 56 a defined quantity of fluid passes through the fluid cooler 74. Due to the fluid flow to the clutch 60 a dynamic pressure is produced at the diaphragm 84 provided in the connecting line 68, which is used as a hydraulic parameter for regulating the through-flow quantity in that the dynamic pressure passes into a pressure space 86 where it acts to support the spring force on the valve slide 64.

In this embodiment of the control system too, the pilot control pressure pVST delivered by the pilot control valve 62 can be used to actuate a second control valve 170, which in this case is activated in an initial range of the pilot control pressure pVST when the pilot control pressure reaches the value PX, so as to switch on or off some other device 171. For that purpose it is unimportant per se, and a matter of free choice for the application concerned, whether the pilot control pressure PX is reached from large or from small pressure values of the pilot control pressure pVST.

Figure 3A:
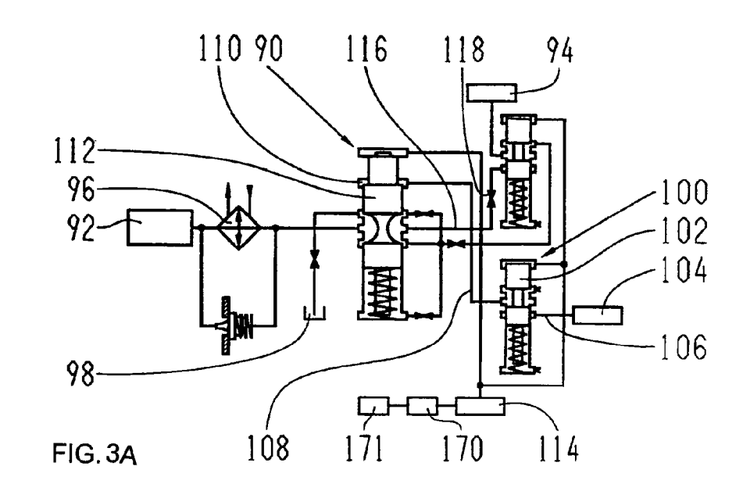
Figure 3B:
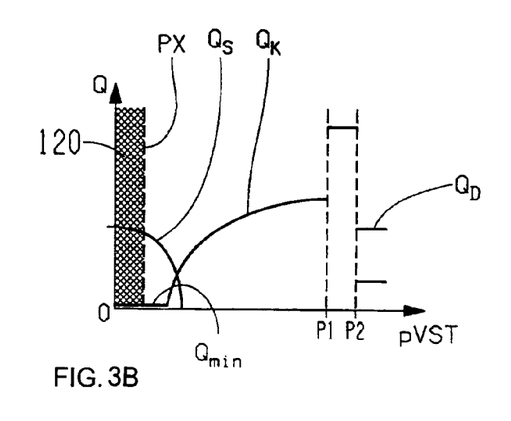

FIG. 3A shows a control system whose mode of operation is similar to that of the control system of FIG. 2A. It comprises a first control valve 90 connected to a fluid supply 92, a clutch 94 supplied by the control valve 90, a fluid cooler 96 upstream from the control valve 90 and a reservoir tank 98 for the bypass function, as already described. The control valve 90 is designed for a volume flow $Q_K$ to the clutch 94 smaller compared with the diagram of FIG. 2B, as can be seen in particular from the diagram of FIG. 3B shown to the right of the control system. Thanks to the more favorable ratio of the fluid volume flow $Q_K$ to the pilot control pressure pVST this enables more effective regulation, as already explained earlier. Nevertheless, in order to be able still to provide a larger volume flow in the upper volume flow range for the clutch 94 in certain operating situations, the regulating function of the control valve 90 can be switched off by means of an additional, booster valve 100 when a pilot control pressure pVST=P1 is reached, and the fluid flow through the control valve maximized. When the pilot control pressure pVST=P1 is reached, the valve slide 102 of the booster valve 100 is pushed down in the direction toward the valve restoring spring, whereby an additional control pressure 104 is delivered via the lines 106 and 108 to a pressure space 110 of the control valve 90, which moves the valve slide 112 to its lower end position against the force of the associated valve restoring spring.

When the pilot control pressure delivered by the control valve 114 increases further to a value P2, the control valve 90 is switched off but a defined fluid quantity $Q_D$ can still be delivered to the clutch 94 via a connecting line 116 and a diaphragm 118 arranged in it.

The bypass function corresponds to the function described in connection with FIG. 2B and does not therefore need to be described again. Again, when a lower range of the pilot control pressure pVST, indexed 120, has been reached (pilot control pressure limit value PX), the second control valve 170 is activated, which switches on or off some other device 171.

Figure 4A:
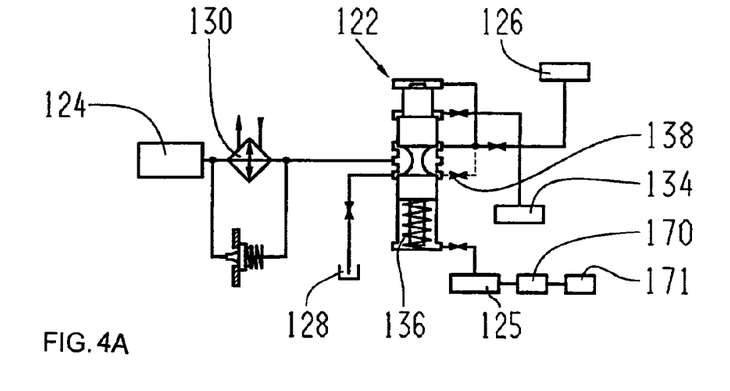
Figure 4B:
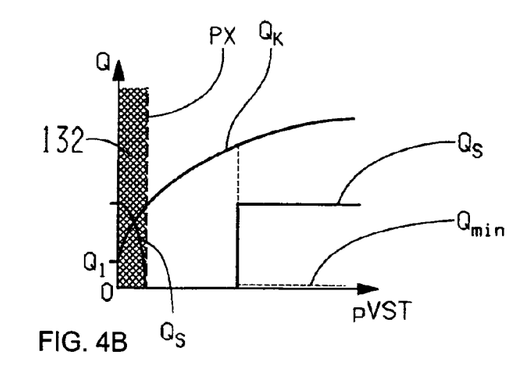

FIG. 4A shows a further variant of a control system, with a first control valve 122 connected to a fluid supply 124, which controls a fluid volume flow to a clutch 126.

In certain applications it may be desired to use the complete pilot control pressure range delivered by the pilot control valve 125 for regulating the fluid volume flow to the clutch 126. With a pilot control pressure range larger, for example, compared with the previous variants, the volume flow $Q_K$ to the clutch 126 can be regulated more precisely, i.e. the volume flow can be metered more exactly. By means of a bypass function similar to the functions previously described, a certain fluid quantity $Q_S$ is again diverted to the reservoir tank 128 in order to ensure a defined fluid throughput through the fluid cooler 130.

In the absence of a pilot control pressure a minimum fluid flow $Q_1$ flows to the clutch 126, which cannot be reduced below a specified minimum quantity. With increasing pilot control pressure pVST, the volume flow $Q_K$ to the clutch 126 increases. The problem therefore arises, that the volume flow $Q_K$ to the clutch 126 cannot be reduced below a certain value $Q_1$. This can largely be avoided by pushing the first control valve 122, by means of a shut-off pressure 134, against the force of the restoring spring 136 to the end position on the spring side. In this position, by means of an adjustable diaphragm 138 a certain fluid quantity $Q_{min}$ can be passed through to the clutch 126 for cooling and lubrication purposes. As already outlined, the lower range 132 of the pilot control pressure pVST can be used to control the second control valve 170, which switches on or off some other device 171. In this case too, the second control valve 170 is activated when the pilot control pressure limit value PX is reached.

Figure 5A:
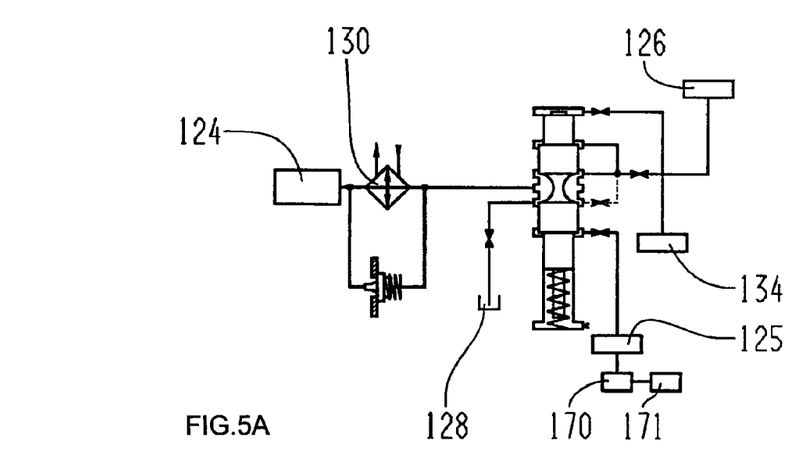
Figure 5B:
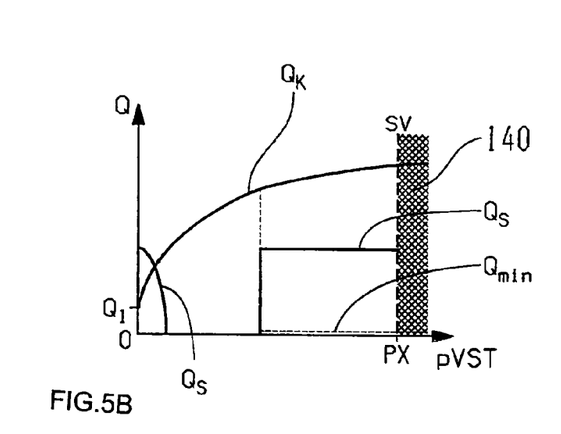

FIG. 5A shows a variant of a control system somewhat modified compared with FIG. 4A, in which, in contrast to the latter, an end range 140 of the pilot control pressure pVST with its pilot control pressure limit value PX can be used to control the second control valve 170 which switches on or off some other device 171. This is shown in the diagram of FIG. 5B and also is indicated by the index SV for the action of a control valve. No description of the other functions is needed since they correspond to the functions already described earlier.

Figure 6A:
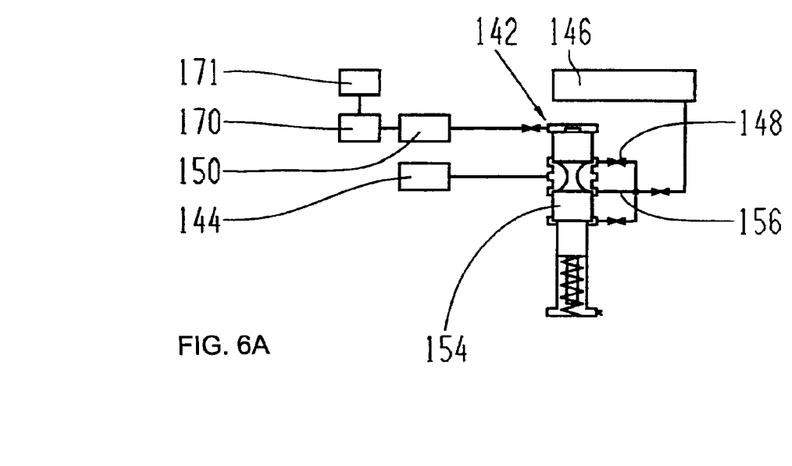

FIG. 6A shows a particularly simple design of a control system according to the invention, which also achieves the objective of the invention described earlier. It comprises a first control valve 142 connected to a fluid supply 144, and a clutch 146 whose cooling and lubrication are regulated by the control valve 142. For some applications it is sufficient to deliver a certain constant volume flow to the clutch 146, but this should be metered as accurately, and as largely independently of control tolerances, as possible. This is achieved in the design according to FIG. 6A by means of an unchanging diaphragm 148, as explained below.

When the pilot control pressure pVST delivered by the pilot control value 150 is low, the volume flow $Q_{K1}$ is passed to the clutch via the unchanging diaphragm 148. The size of this volume flow $Q_{K1}$ depends only on the tolerance of the unchanging diaphragm 148 and fluctuates within only a small range. If the volume flow is kept constant over a larger pilot control pressure range 152, then with this (low) pilot control pressure pVST the second control valve 170 can still be actuated in a control sense, this being activated when the pilot control pressure limit value PX is reached and then switching some other device 171 on or off. In this case it is important for the constant volume flow range $Q_{K1}$ to extend beyond the switching point P1 of the second control valve 170.

If the pilot control pressure pVST increases further, the volume flow Q is reduced to a minimum $Q_{K2}$. The only fluid then flowing to the clutch 146 is the quantity allowed through by gap leakage at the control valve 142. By varying the overlap ratio at the valve slide 154 of the control valve 142, the range of the minimum volume flow can be varied in width.

A farther increase of the pilot control pressure pVST then opens up the aperture to the main line 156 for supplying the clutch 146, and the volume flow $Q_K$ to the clutch 146 is regulated continuously, as already explained.

Figure 6B:
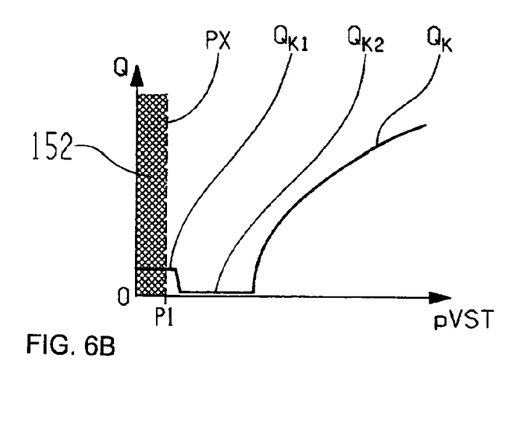

Referring to the diagram, regulated volume flow variation $Q_K$ in FIG. 6B it can be seen that in the range of small volume flows the gradients are very steep, i.e. small tolerance fluctuations of the pilot control pressure change the quantity of fluid flowing to the clutch 146 quite considerably and should therefore hardly be allowed in practice. In this range the proposed unchanging diaphragm solution is helpful. For small fluid quantities the range with a constant volume flow $Q_{K1}$, is controlled. If it is desired to increase the volume flow to the clutch 146, then the transition is made to the variable volume flow range $Q_K$. With larger fluid quantities the volume flow then varies with flatter gradients and can correspondingly be better regulated.

Figure 7A:
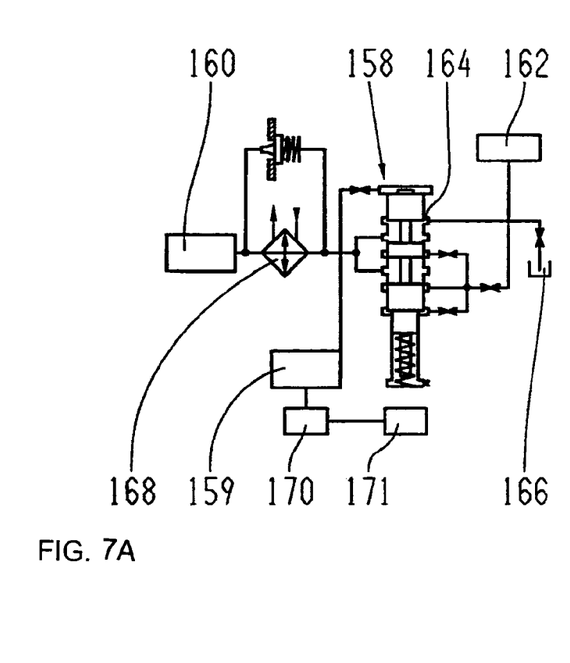
FIGS. 7A and 7B hydraulic control system with a first control valve having a shut-off function, and a diagram showing the pressure a second control valve is activated in the initial pilot control pressure range.
Figure 7B:
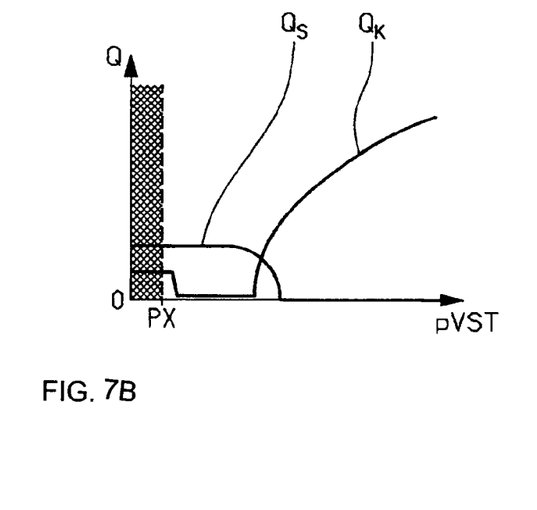

FIGS. 7A and 7B shows a further variant similar to FIGS. 6A and 6B, comprising a first control valve 158 connected to a fluid supply 160, and a clutch 162 whose volume flow $Q_K$ used for cooling or lubrication is controlled by the control valve 158 by virtue of the pilot control pressure 159. Compared with the control valve 142 of FIG. 6A, the control valve 158 is extended by a further control edge 164, by which a fluid volume flow $Q_S$ can be passed via a bypass to a reservoir tank 166, so that the fluid cooler 168 connected upstream from the control valve 158 always has a specified minimum throughput over all the operating ranges of the control valve 158. Here too, the second control valve 170 serves to switch on or off some other device 171 if the pressure falls below a low pilot control pressure limit value PX or just exceeds the pilot control pressure pVST=0.

Indexes

2 First control valve
4 Fluid supply
6 Clutch
8 Shut-off valve
10 Pilot control valve
12 Fluid supply line
14 Fluid cooler
16 Bypass valve
18 Diaphragm
20 Line
22 Restoring spring
24 Pressure space
26 Valve slide
28 Valve slide
30 Restoring spring
32 Connecting line
34 Spring space
36 Pressure space
38 Tank connection
40 Pressure space
42 Line
44 Line
46 Diaphragm
48 Line
50 Bypass diaphragm
52 Reservoir tank
54 Control edge
55 Volume flow range
56 First control valve
58 Fluid supply
60 Clutch
62 Pilot control valve
64 Valve slide
66 Restoring spring
68 Connecting line
70 Line
72 Diaphragm
74 Fluid cooler
76 Line
78 Bypass diaphragm
80 Reservoir tank
82 Pressure space
84 Diaphragm
86 Pressure space
88 Upper volume flow range
90 First control valve
92 Fluid supply
94 Clutch
96 Fluid cooler
98 Reservoir tank
100 Booster valve
102 Valve slide
104 Control pressure
106 Line
107 Line
110 Pressure space
112 Valve slide
114 Pilot control valve
116 Connecting line
118 Diaphragm
120 Upper volume flow range
122 First control valve
124 Fluid supply
126 Clutch
128 Reservoir tank
130 Fluid cooler
132 Upper volume control range
134 Shut-off pressure
136 Restoring spring
138 Adjustable diaphragm
140 Volume flow range
142 First control valve
144 Fluid supply
146 Clutch
148 Unchanging diaphragm
150 Pilot control valve
152 Upper volume flow range
154 Valve slide
156 Main line
158 First control valve
160 Fluid supply
162 Clutch
164 Control edge
170 Second control valve
171 Other device controlled by 170
pVST Pilot control pressure
PX Limit value of the pilot control pressure
P1, P2 Pilot control pressures
Q Volume flow
$Q_{min}$ Minimum volume flow
$Q_1$ Initial volume flow
$Q_2$ Final volume flow
$Q_3$ Fluid quantity
$Q_K$ Continuously increasing volume flow
$Q_{K1}$ Constant volume flow range
$Q_{K2}$ Constant volume flow range
$Q_S$ Bypass volume flow
$Q_D$ Defined fluid quantity
SV Shift valve

The invention claimed is:
1. A hydraulic control system for controlling a variable fluid volume flow to a consumer (6, 60, 94, 126, 146, 162)

with a hydraulic pilot-controlled control valve connected to a fluid supply, the hydraulic control system comprising:

an independent first control valve (2, 56, 90, 122, 142) being designed such that the first control valve (2, 56, 90, 122, 142) delivers a specified initial volume flow ($Q_1$), in an absence of a variable pilot control pressure (pVST), the first control valve (2, 56, 90, 122, 142) delivers a continuously increasing volume flow ($O_K$) as the variable pilot control pressure (pVST) increases, and at least one independent second control valve (170) which is a hydraulic pilot-controlled control valve (170), and the second control valve (170) being activated in a specified range (55, 88, 120, 132, 140, 152) of the variable pilot control pressure (pVST), and the first control valve is connected to a fluid reservoir tank and delivers a bypass volume flow to the fluid reservoir tank in the absence of the pilot control pressure, the first control valve reduces the bypass volume flow as the pilot control pressure increases.

2. The hydraulic control system according to claim 1, wherein the first control valve (2) is designed such that in the absence of the pilot control pressure (pVST), the first control valve (2) is regulated by a fluid supply pressure (fluid supply 4) to a control position in which first control valve (2) delivers a specified initial volume flow ($Q_1$) to the consumer.

3. The hydraulic control system according to claim 1, wherein a shut-off valve (8), controlled by the pilot control pressure (pVST), is associated with the first control valve (2), and shuts off the first control valve (2) when the shut-off pressure (P1) is reached.

4. The hydraulic control system according to claim 1, wherein a fluid cooler (14) is arranged in a fluid supply line (12) of the first control valve (2) between the first control valve (2) and the fluid reservoir tank (52).

5. The hydraulic control system according to claim 1, wherein a booster valve (100), controlled by a pilot control pressure (104), is associated with the first control valve (90), by which the first control valve (90) is switched to a position in which a regulating function of the first control valve (90) is switched off and a maximum volume flow passes therethrough.

6. The hydraulic control system according to claim 1, wherein the second control valve (170) is activated in an initial range (88, 120, 132, 152) of the pilot control pressure range of the first control valve (56).

7. The hydraulic control system according to claim 1, wherein the second control valve (170) is activated in an end range (55, 140) of the pilot control pressure range of the first control valve (2).

8. The hydraulic control system according to claim 1, wherein the second control valve (170) activates emergency operation of one of the consumer (6, 60, 94, 126, 146, 162) and another device (171).

9. A hydraulic control system for controlling a variable fluid volume flow to a consumer (6, 60, 94, 126, 146, 162) with a hydraulic pilot-controlled control valve connected to a fluid supply, the hydraulic control system comprising:

an independent first control valve (2, 56, 90, 122, 142) being designed such that the first control valve (2, 56, 90, 122, 142) delivers a specified initial volume flow ($Q_1$), in an absence of a variable pilot control pressure (pVST), the first control valve (2, 56, 90, 122, 142) delivers a continuously increasing volume flow ($Q_K$) as the variable pilot control pressure (pVST) increases, and at least one independent second control valve (170) which is a hydraulic pilot-controlled control valve (170), and the second control valve (170) being activated in a specified range (55, 88, 120, 132, 140, 152) of the variable pilot control pressure (pVST), and the first control valve (2) is designed such that, on reaching a specified pilot control pressure or shut-off pressure (P1) which delimits the pilot control pressure range at a top, the first control valve (2) is switched to a position in which the first control valve (2) still delivers only a minimum volume flow ($Q_{min}$).

10. The hydraulic control system according to claim 9, wherein the minimum volume flow ($Q_{min}$) corresponds to a leakage volume flow.

11. The hydraulic control system according to claim 9, wherein the minimum volume flow ($Q_{min}$) corresponds to a defined residual volume flow.

12. A hydraulic control system for variably controlling a volume of fluid flowing to a consumer (6), the control system comprising:

a first control valve (2) being connected to a fluid supply (4) and hydraulically controlled by a pilot control pressure (pVST) such that the first control valve (2) directs an initial volume of fluid flow ($Q_1$) to the consumer (6) when the pilot control pressure (pVST) is not supplied to the first control valve (2), and the first control valve (2) directs an increasing volume of fluid flow ($Q_K$) to the consumer (6) when the first control valve (2) is subject to an increasing volume of the pilot control pressure (pVST); and at least one second control valve (170) being activated by the pilot control pressure (pVST) when the pilot control pressure (pVST) is within a specified range (55); and a shut-off valve being in communication with the first control valve, the shut-off valve is actuated by the pilot control pressure to shut off the first control valve when the pilot control pressure reaches a shut-off pressure.

\* \* \* \* \*